US009594957B2

(12) United States Patent
Tanaka et al.

(10) Patent No.: US 9,594,957 B2
(45) Date of Patent: Mar. 14, 2017

(54) APPARATUS AND METHOD FOR IDENTIFYING A STILL IMAGE CONTAINED IN MOVING IMAGE CONTENTS

(75) Inventors: Kazumasa Tanaka, Kanagawa (JP);
Kenji Tanaka, Kanagawa (JP);
Yoshihiro Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 538 days.

(21) Appl. No.: 13/639,044

(22) PCT Filed: Apr. 4, 2011

(86) PCT No.: PCT/JP2011/001995
§ 371 (c)(1),
(2), (4) Date: Dec. 6, 2012

(87) PCT Pub. No.: WO2011/125322
PCT Pub. Date: Oct. 13, 2011

(65) Prior Publication Data
US 2013/0077876 A1 Mar. 28, 2013

(30) Foreign Application Priority Data
Apr. 9, 2010 (JP) ................. P2010-090606

(51) Int. Cl.
*G06K 9/54* (2006.01)
*G06K 9/00* (2006.01)
(Continued)

(52) U.S. Cl.
CPC .... *G06K 9/00711* (2013.01); *G06F 17/30781* (2013.01); *G11B 27/105* (2013.01);
(Continued)

(58) Field of Classification Search
None
See application file for complete search history.

(56) References Cited

U.S. PATENT DOCUMENTS 6,239,846 B1 *  5/2001  Billing ................. G11B 27/034
                                                      348/578
7,979,879 B2 *  7/2011  Kazama ............. G06F 3/04815
                                                      345/418
(Continued)

FOREIGN PATENT DOCUMENTS

DE    199 46 727     3/2000
GB    2 342 216      4/2000
(Continued)

OTHER PUBLICATIONS

Eiji Kasutani, Hisashi Miyamori, Hideyoshi Tominaga, Proposal of Rapid Video Retrieval Method using Motion Vectors in Compressed Video, Proceedings of the 1996 Information and Systems Society Conference of IEICE, 1996, M9, P278.

*Primary Examiner* — Jayesh A Patel
(74) *Attorney, Agent, or Firm* — Frommer Lawrence & Haug LLP; William S. Frommer

(57) ABSTRACT

Apparatus for identifying one or more still images in one or more moving image contents. An identifying unit is configured to identify one or more still images included in the moving image contents having one or more features that closely resemble particular features. A display controller is configured to cause the display on a timeline associated with the moving image contents of the location of an identified still image in at least one of the moving image contents.

15 Claims, 10 Drawing Sheets

(51) Int. Cl.
  *G06F 17/30* (2006.01)
  *G11B 27/10* (2006.01)
  *G11B 27/28* (2006.01)
  *G11B 27/34* (2006.01)
  *H04N 21/482* (2011.01)
  *H04N 21/81* (2011.01)

(52) U.S. Cl.
  CPC .............. *G11B 27/28* (2013.01); *G11B 27/34* (2013.01); *H04N 21/4828* (2013.01); *H04N 21/8153* (2013.01)

(56) References Cited

U.S. PATENT DOCUMENTS

| | | | | |
|---|---|---|---|---|
| 8,468,467 | B2* | 6/2013 | Yamashita | 715/838 |
| 8,745,500 | B1* | 6/2014 | Kostello | G11B 27/34 386/282 |
| 8,799,781 | B2* | 8/2014 | Nishimori | H04N 19/61 715/719 |
| 9,325,946 | B2* | 4/2016 | Tanaka | G06F 17/30256 |
| 2003/0016254 | A1 | 1/2003 | Abe | |
| 2006/0204142 | A1* | 9/2006 | West | G06F 17/30864 382/305 |
| 2007/0047843 | A1* | 3/2007 | Kazama | G11B 27/034 382/305 |
| 2007/0074115 | A1* | 3/2007 | Patten | G11B 27/032 715/716 |
| 2007/0074244 | A1* | 3/2007 | Miyamori | G06F 17/30843 725/34 |
| 2007/0153091 | A1* | 7/2007 | Watlington | H04N 7/15 348/208.14 |
| 2007/0225574 | A1* | 9/2007 | Ueda | A61B 5/00 600/300 |
| 2007/0274596 | A1* | 11/2007 | Murata | G06F 17/30793 382/209 |
| 2009/0089056 | A1* | 4/2009 | Fujii | G06F 17/30746 704/246 |
| 2009/0154898 | A1* | 6/2009 | Barrett et al. | 386/124 |
| 2010/0088646 | A1* | 4/2010 | Nishimori | H04N 19/61 715/838 |
| 2011/0119588 | A1* | 5/2011 | Siracusano, Jr. | G06F 3/0481 715/723 |
| 2015/0036931 | A1* | 2/2015 | Loui | G06K 9/46 382/195 |
| 2015/0169989 | A1* | 6/2015 | Bertelli | G06K 9/6202 382/165 |

FOREIGN PATENT DOCUMENTS

| | | |
|---|---|---|
| JP | 2000-115684 | 4/2000 |
| JP | 2003-289487 | 10/2003 |
| JP | 2006-33504 | 2/2006 |
| JP | 2006-39753 | 2/2006 |
| JP | 2010-28184 | 2/2010 |
| KR | 10-2000-0023494 | 4/2000 |

* cited by examiner

APPARATUS AND METHOD FOR IDENTIFYING A STILL IMAGE CONTAINED IN MOVING IMAGE CONTENTS

TECHNICAL FIELD

The present invention relates to a content searching apparatus, a content searching method, and a program. More particularly, the invention relates to a content searching apparatus, a content searching method, and a program for displaying the results of a search through moving image contents for images in a more comprehensible manner for verification by a user.

BACKGROUND ART

Some techniques for image search regarding image (moving image) contents are proposed hereunder.

When the result of the search for images regarding an image content is to be displayed, it is customary to display an image of the first frame of the content obtained through the search as well as representative images of that content. Alternatively, if frames corresponding to a search image are detected from the content as a result of the search, these frames may be displayed.

Also, there exist techniques which, given a list of search results, allow retrieved contents to be selectively reproduced for image verification, such as described in, for example, Japanese Laid-Open Application 2003-289487.

Furthermore, in the process of editing a content, a timeline display indicating the waveform of an audio signal of the content along the temporal axis has been used in recent years to let the user better recognize the temporal length and reproduction position of the content being edited.

DISCLOSURE OF THE INVENTION

However, if a plurality of results are typically obtained from the search, conventional techniques do not enable the search results to be compared with one another as moving images. As a result, it has been difficult, if not impossible, to compare the retrieved contents in terms of what is contained inside based on the search results.

For example, according to the conventional techniques, thumbnails or representative images are displayed as search results. The user has no choice but to compare these thumbnails or representative images from a plurality of search results visually with one another, when comparing the multiple contents represented thereby.

Also, according to the conventional techniques, each content including the images obtained as a result of the search can be reproduced for verification. However, it has been difficult, if not impossible, to simultaneously reproduce multiple search results for comparison.

SUMMARY OF INVENTION

The present invention has been made in view of the above circumstances and provides arrangements for displaying the results of a search through moving image contents in a more comprehensible manner for verification by the user.

In accordance with one embodiment, apparatus is provided for identifying one or more still images in one or more moving image contents.

The apparatus includes an identifying unit configured to identify one or more still images included in the moving image contents that have at least one feature that closely resembles one or more particular features. A display controller is configured to cause the display on a timeline associated with the moving image contents of the location of an identified still image in the moving image contents.

Preferably, the identifying unit identifies scenes in each of the moving image contents that contain a still image whose features closely resemble the particular features; and said identified scenes are displayed.

In one advantageous embodiment, different moving image contents are displayed concurrently.

In another embodiment, the display controller causes the display in alignment, on a common timeline axis, of the locations in the moving image contents at which the identified still images are located.

In a further embodiment, the moving image contents include audio information associated with the moving image contents, and the display controller causes the display of timelines of signal waveforms of the audio information in respective scenes of the moving image contents.

In yet another embodiment the display controller causes the display of indicia associated with respective ones of the moving image contents, the indicia representing durations of the scenes in respective moving image contents.

Advantageously, the display controller causes the moving image contents to be reproduced, and causes the display along the aforementioned timeline of moving sliders representing the current reproduction positions of the moving image contents.

As a feature, the identified still images in a plurality of the moving image contents are concurrently displayed.

Advantageous Effects of Invention

Accordingly, it is possible to display the results of a search through moving image contents in a more comprehensible manner for verification by the user.

DESCRIPTION OF EMBODIMENTS

Figure 1:
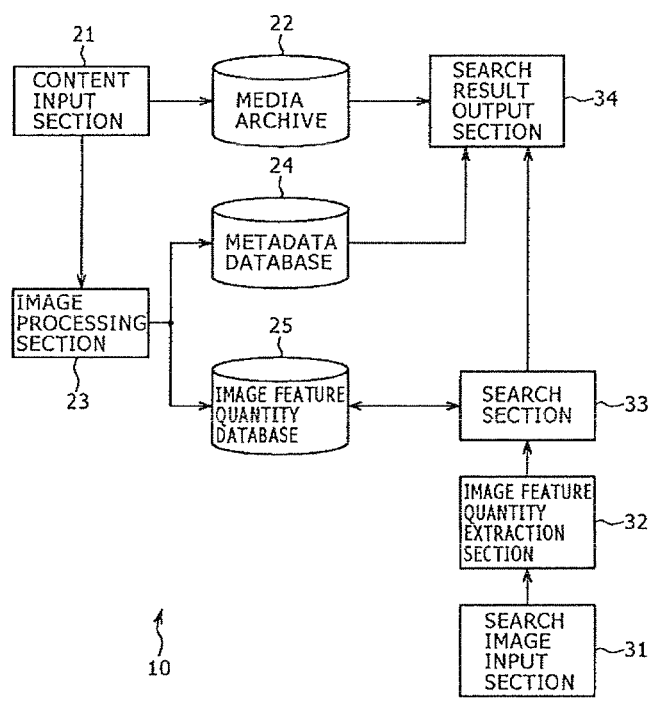
FIG. 1 is a block diagram showing a typical structure of a content searching apparatus as one embodiment of the present invention.

Referring to the drawings, FIG. 1 is a block diagram showing a typical structure of a content searching apparatus in accordance with one embodiment of the present invention.

This content searching apparatus 10 is an apparatus which has a plurality of moving image contents stored in a media archive 22 and which searches the stored contents for those including an input search image.

As shown in FIG. 1, the content search apparatus 10 is made up of a content input section 21, the media archive 22, an image processing section 23, a metadata database 24, and an image feature quantity database 25. Also, the content searching apparatus 10 includes a search image input section 31, an image feature quantity extraction section 32, a search section 33, and a search result output section 34.

The content input section 21 receives the input of content data. As described above, the contents are moving image contents that may include sounds and captions as needed. For example, these contents may be the contents edited as part of a TV program to be broadcast.

The media archive 22 stores the content data input from the content input section 21. For example, the media archive 22 stores large amounts of content data furnished with identification information for identifying the individual contents and allows the data to be retrieved and output as needed.

The image processing section 23 analyzes the content data supplied from the content input section 21 and extracts metadata from the supplied contents. In this context, the metadata typically refers to information about scene change points of the contents, and information about points in time that are necessary for providing a timeline display to be discussed later, as well as file names and data sizes. Also, the metadata may include such information as waveforms of audio signals in the contents.

The metadata extracted by the image processing section 23 is used for contents to be displayed on a timeline basis as will be discussed later. For example, the metadata extracted by the image processing section 23 is stored in the metadata database 24 in correspondence with content identification information.

Also, the image processing section 23 analyzes the content data supplied from the content input section 21, and extracts image feature quantities from the supplied contents. In this context, the image feature quantity is information used in a process performed by the search section 33, to be discussed later, to obtain degrees of similarity to a search image. For example, where a single-frame still image making up part of a content is divided into a plurality of predetermined areas, the representative color of each of these areas may be described using information constituting the image feature quantity. As another example, the image feature quantity may be the information formed by a histogram of the pixel values of a single-frame still image. As a further example, the image feature quantity may be constituted by any other information that provides degrees of similarity to the search image in the process carried out by the search section 33.

The image feature quantity extracted by the image processing section 23 is stored into the image feature quantity database 25 typically in correspondence with content identification information and a frame number.

The search image input section 31 receives the input of a search image as a still image. For example, the search image is any image selected by the user. A search image is input whereby the media archive 22 is searched for those images of the stored contents that are similar to the input search image.

As with the image processing section 23, the image feature quantity extraction section 32 extracts the one or more particular image features from the search image input through the search image input section 31.

The search section 33 compares the image feature quantity (i.e. the particular image feature or features) extracted from the search image by the image feature quantity extraction section 32, with the image feature quantities stored in the image feature quantity database 25 in accordance with a predetermined principle. Through the comparison, the search section 33 calculates as a numerical value the degree of similarity between the image feature quantity of the search image on the one hand, and the image feature quantity of each of the single-frame still images making up each of the contents stored in the image feature quantity database 25 on the other hand.

For example, the search section 33 determines the still images having the image feature quantities of which the degrees of similarity to the image feature quantity of the search image are higher than a predetermined threshold value. The search section 33 then supplies the search result output section 34 with the identification information of the contents from which the still images have been detected, along with the frame numbers of these images, thereby identifying the still images in the contents that closely resemble the search image. If, from a single content, a plurality of still images have been detected which possess the image feature quantities whose degrees of similarity to the image feature quantity of the search image are higher than a predetermined threshold value, then the search section 33 typically supplies the search result output section 34 with the frame number of the still image having the highest degree of similarity.

In the manner described above, the search section 33 determines the contents from which the frames of the still images having high degrees of similarity to the search image (i.e., the frames of the still images similar to the search image) are detected, and notifies the search result output section 34 of these contents.

Based on the identification information supplied from the search section 33 regarding the contents, the search result output section 34 retrieves the metadata of the contents from the metadata database 24. And the search result output section 34 includes a display controller to generate display data for displaying the search result based on the frame numbers of the still images fed from the search section 33 and on the retrieved metadata.

The display data to be output from the search result output section 34 is sent typically to a display device, not shown, for display as images that will be discussed later. In an alternative embodiment, the display device may be included in the search result output section 34.

Explained next are examples of how the result of search is displayed by the content searching apparatus 10.

Figure 2:
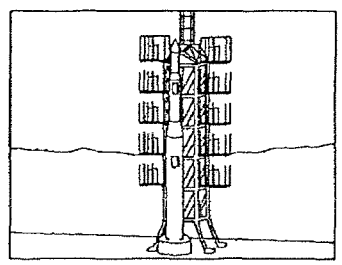
FIG. 2 is a schematic view showing a typical search image.

FIG. 2 is a schematic view showing a typical search image (still image) that is input through the search image input section 31. This example makes up an image indicating a missile and its launching pad.

The search image may be arranged to be either displayed on the display device or not displayed thereon.

Figure 3:
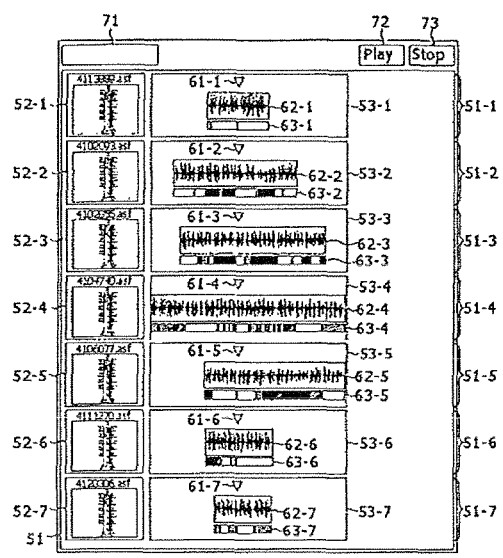
FIG. 3 is a schematic view of a typical display screen showing search results.

FIG. 3 is a schematic view of a typical screen displayed on the display device, not shown, based on the display data output from the search result output section 34. FIG. 3 indicates an example of the screen displayed when, with the search image of FIG. 2 input through the search image input section 31, a search has been performed through the contents stored in the media archive 22.

The screen shown in FIG. 3 has a search result display region 51. This example shows the search result display region 51 indicating seven contents from which the still images with high degrees of similarity to the search image of FIG. 2 have been detected. And the search result display region 51 has regions 51-1 through 51-7 each displaying information about each of the above-mentioned seven contents.

The region 51-1 displays the information about the first content.

A still image display region 52-1 is a region that displays the still image which was detected from the first content and which has a high degree of similarity to the search image. A notation "4113889.asf" shown at the top of the still image in the still image display region 52-1 is the identification information identifying the first content.

A timeline display region 53-1 is a region that provides a timeline display regarding the first content. In the illustration, the horizontal direction corresponds to the temporal axis of the content.

In this context, the timeline display regarding a content is provided when a given content is displayed in such a manner that the user can visually recognize the temporal length of the content as well as the temporal location of the scenes and frames inside the content. And although the timeline display regarding the content involves displaying the content in question in one way or another, it does not mean that the content will be reproduced and displayed as a moving image. For example, the timeline display of a given content signifies that graphics, waveforms, symbols, etc., representing the content or its components are displayed along the temporal axis.

An inverted triangle symbol 61-1 displayed in the timeline display region 53-1 indicates the temporal location of that still image frame in the first content which is displayed in the still image display region 52-1.

A waveform display region 62-1 shown in the timeline display region 53-1 is a region that displays the signal waveform of the sounds included in the first content. Alternatively, the waveform display region 62-1 may display the waveform of the image. As another alternative, the timeline display region 53-1 may be arranged not to include the waveform display region 62-1.

A scene display region 63-1 shown in the timeline display region 53-1 is a region that displays representations of scenes in the first content. The scene display region 63-1 displays representations of each of the scenes in the first content in the form of a rectangle whose width (i.e., length) corresponds to the temporal length of the scene in question. That is, the scene display region 63-1 is seen displaying three rectangles, which means the first content is made up of three scenes. The start point and end point of each scene are determined on the basis of scene change point information included in the metadata retrieved from the metadata database 24. The start point and end point of each scene are then used to display the rectangle corresponding to the scene in question in the scene display region 63-1.

Each rectangle in the scene display region 63-1 is displayed in the color representative of the corresponding scene. The representative color of a given scene may be typically determined as the color corresponding to the largest number of pixel values from among the pixel values making up all frames within the scene in question. Alternatively, the representative color of each scene may be determined in some other appropriate manner. In short, any color suitable for the scene of interest may be selected as the representative color of that scene.

For example, the representative color of a given scene may be determined by analyzing the data of the corresponding content when display data is generated. As another example, the representative color of each scene may be determined beforehand and included in the relevant metadata.

Likewise, a region 51-2 displays information about the second content. That is, a still image display region 52-2 displays the still image which was detected from the second content and which has a high degree of similarity to the search image. A timeline display region 53-2 is a region that provides a timeline display of the second content.

Further, regions 51-3 through 51-7 display information about the third through the seventh contents, respectively, in the same manner as the regions 51-1 and 51-2.

In the ensuing description, the individual still image display regions may be referred to generically as the still image display region 52; the individual timeline display regions may likewise be referred to generically as the timeline display region 53; and the individual symbols may also be referred to generically as the symbol 61, as long as there is no need to distinguish between the individual regions or symbols.

As shown in FIG. 3, the timeline display regions 53-1 through 53-7 have the same length in the horizontal direction. And in the timeline display regions 53-1 through 53-7, the symbols 61-1 through 61-7 have the same location in the horizontal direction of FIG. 3. That is, these symbols are in alignment on a common axis of the timeline display regions, thereby depicting the location in the scenes of the respective contents of the still image frames that closely resemble the search image.

That is, the search result output section 34 determines the display positions of the individual display regions as follows.

Of the first through the seventh contents, the content having the longest temporal length from its start time up to the symbol 61 has its starting location aligned with the leftmost position of the timeline display region 53. In FIG. 3, the fourth content has its starting location aligned with the leftmost position of the timeline display region 53. Also, of the first through the seventh contents, the content having the longest temporal length from its end time up to the symbol 61 has its ending location aligned with the rightmost position of the timeline display region 53. In FIG. 3, the fourth and the fifth contents have their ending locations aligned with the rightmost position of the timeline display region 53.

Since the search section 33 has already determined the frame numbers of the still images having the high degrees of similarity to the search image as discussed above, it is possible to determine the temporal length from either the start time or the end time of a given content to the symbol 61.

And based on the temporal lengths of the fourth and the fifth contents, the time corresponding to the unit length of the timeline display region 53 in the horizontal direction is determined.

For example, the search result output section 34 defines the location in the horizontal direction of the symbol 61 displayed in FIG. 3 as the center of the timeline display region 53. This in turn determines the locations of the waveform display region 62 and scene display region 63 displayed in the regions 51-1 through 51-7. And the search result output section 34 generates display data for displaying the image such as one shown in FIG. 3.

In this example, the waveform displayed in the waveform display region 62 of the timeline display region 53 is shown displayed in keeping with the temporal axis. Alternatively, the timeline display of the contents may be provided in some other suitable manner. For example, the timeline display region 53 may be arranged to exclude the waveform display region 62 as discussed above. In short, the contents need only be displayed in such a manner that the user can easily recognize their temporal axes.

And a button 71 shown in FIG. 3 is typically used as a search start button that constitutes a GUI part. For example, following the input of the search image shown in FIG. 2, operating the button 71 executes a search for the still images having high degrees of similarity to the input search image. That is, the screen of FIG. 3 is a screen displayed after the user has operated the button 71.

A button 72 shown in FIG. 3 typically constitutes a GUI part and is used to issue a command to reproduce the contents in the regions 51-1 through 51-7 in FIG. 3. Likewise, a button 73 in FIG. 3 is typically used as a button to stop the reproduction of the contents that was started by operation of the button 72.

Figure 4:
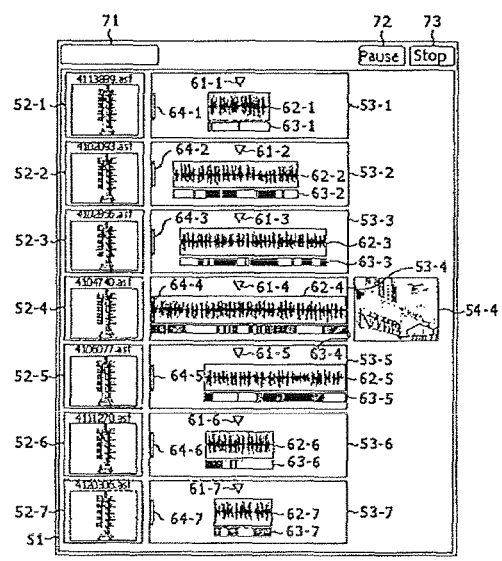
FIG. 4 is a schematic view of a typical screen showing contents being reproduced on the screen of FIG. 3.

If the button 72 is operated in the state of FIG. 3, the contents in the regions 51-1 through 51-7 start to be reproduced, which causes the screen shown in FIG. 4 to be displayed.

With the reproduction of the contents started on the screen of FIG. 4, a moving slider 64 indicating the reproducing position appears in the timeline display region 53. The slider 64 is typically displayed as a rectangular frame in red. As time elapses, the slider moves, and its length increases in the horizontal direction of FIG. 4. The rightmost position of the slider 64 represents the current reproducing location of the content.

In the example of FIG. 4, only a short time has passed since the start of the content reproduction, so that the moving image of the fourth content alone is being reproduced. That is, a slider 64-4 is displayed superposed on the waveform appearing in the waveform display region 62-4. The rightmost position of the slider 64-4 is located approximately at the center of the leftmost rectangle displayed in the scene display region 63-4. Meanwhile, the rightmost positions of the sliders 64-1 through 64-3 and 64-5 through 64-7 have yet to reach the leftmost rectangles displayed in the scene display regions 63-1 through 63-3 and 63-5 through 63-7, respectively. That is, reproduction of the first through third and fifth through seventh contents associated with display regions 51-1 through 51-3 and 51-5 through 51-7 have not yet begun.

Thus in the example of FIG. 4, the moving image of only the fourth content is currently reproduced; the image being reproduced is displayed in a reproduced image display region 54-4. That is, the reproduced image display region 54-4 displays the moving image obtained by reproducing the fourth content.

Since the content has already started to be reproduced in the example of FIG. 4, the button 72 serves as a "pause" button that temporarily stops the content reproduction when operated.

Figure 5:
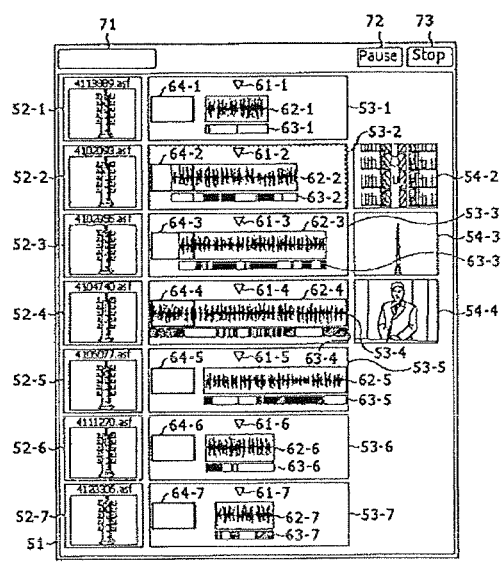
FIG. 5 is a schematic view of a typical screen showing the contents being further produced over time since the state of FIG. 4.

As more time elapses from the state of the screen displayed as shown in FIG. 4, the screen indicated in FIG. 5 appears.

In the example of FIG. 5, with more time having elapsed since the start of the content reproduction, the slider 64 is shown longer in the horizontal direction than in FIG. 4. Concomitantly with this, the second and the third contents in the example of FIG. 5 now are reproduced in addition to the fourth content.

That is, the sliders 64-2 through 64-4 are shown superposed on the waveforms displayed in the waveform display regions 62-2 through 62-4, respectively. And the rightmost positions of the sliders 64-2 through 64-4 are each located on one of the rectangles displayed in the scene display regions 63-2 through 63-4.

Thus in the example of FIG. 5, the moving images of the second through the fourth contents are reproduced. The reproduced images are displayed in the reproduced image display regions 54-2 through 54-4. That is, the reproduced image display regions 54-2 through 54-4 display the moving images obtained by reproducing the second through the fourth contents, respectively.

As more time elapses since the state in which the screen of FIG. 4 was displayed, the slider 64 is further moved in the horizontal direction of FIG. 5. Then the fifth, the sixth, the first, and the seventh contents start to be reproduced one after another. Thus the reproduced image display regions 54-5, 54-6, 54-1, and 54-7 display the moving images obtained by reproducing the respective contents. That is, the different moving image contents are displayed concurrently.

And when the rightmost position of the slider 64 coincides with the symbol 61 in the vertical direction of FIG. 5, the image shown in the still image display region 52 is displayed in the reproduced image display region 54 because that image in each of the contents now is reproduced. This allows the user to check comparatively how the first through the seventh contents have been edited and how their images with high degrees of similarity to the search image have been displayed. That is, the user can not only verify where the object images (i.e., images similar to the search image) are located in the contents but also compare the images before and after each object image as moving images.

Also, on the screen displaying the results of the search performed by the content searching apparatus 10, the user may select a rectangle in the scene display region 63 of the timeline display region 53, which causes the scene corresponding to the selected rectangle to be reproduced repeatedly. As mentioned above, each of the rectangles in the scene display region 63 is displayed corresponding to the relevant scene of the content in question.

For example, suppose that the user wants to reproduce repeatedly the scene including the image displayed in the still image display region 52-2 regarding the second content. In this case, the user selects the fifth rectangle from left among the rectangles displayed in the scene display region 63-2 of the timeline display region 53-2. On the basis of the position of the symbol 61-2 in the vertical direction of FIG. 5, it can be seen that the image displayed in the still image display region 52-2 is included in the fifth scene of the second content.

Figure 6:
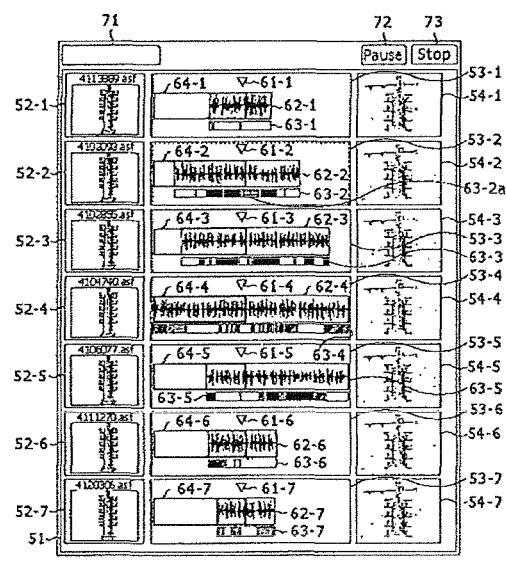
FIG. 6 is a schematic view of a typical screen showing selected scenes being reproduced repeatedly.

In that, the screen shown in FIG. 6 is displayed. In the example of FIG. 6, the fifth rectangle 63-2a from left is selected and highlighted among the rectangles displayed in the scene display region 63-2 of the timeline display region 53-2. This causes the reproduced image display region 54-2 to display repeatedly the moving image of the scene corresponding to the rectangle 63-2a from the start time to the end time of the scene in question.

It is assumed here that each of the rectangles in the scene display region 63 is displayed as a GUI part and that the user typically operates a pointing device or the like, not shown, to select any of the rectangles in the scene display region 63.

In that case, not only the second content but also the first as well as the third through the seventh contents are reproduced repeatedly. That is, the reproduced image display region 54 displays the moving images of those scenes in all contents which correspond to the rectangle 63-2a from the start time to the end time of each scene.

For example, in the case of the first content, a moving image from a halfway point of the second scene to a halfway point of the third scene is displayed repeatedly in the reproduced image display region 54-1. Also, in the case of the third content, a moving image from around the beginning of the sixth scene through the entire seventh scene up to a halfway point of the eighth scene is displayed repeatedly in the reproduced image display region 54-3.

As described, no matter which scene is selected from whichever content, all contents displayed in the search result display region 51 are reproduced. In the example of FIG. 6, the rightmost position of the slider 64 is located slightly to the right of the symbol 61. For this reason, the image reproduced immediately after the image shown in the still image display region 52 is displayed in the reproduced image display region 54. In this case, an image of a missile being launched is displayed in the reproduced image display section 54.

In the example of FIG. 6, the fifth rectangle from left is selected from among the rectangles displayed in the scene display region 63-2, so that all contents are reproduced at the locations corresponding to the symbol 61. Thus the images displayed in the still image display regions 52-1 through 52-7 are included in the moving images reproduced repeatedly in the reproduced image display regions 54-1 through 54-7, respectively. With this arrangement, the user can comparatively check the individual contents as moving images by focusing on their target images.

Also, the content searching apparatus 10 can extract from the contents only the scenes that include images similar to the search image. For example, by operating an operation section, not shown, of the content search apparatus 10, the user can issue a command to display a list of scenes including images similar to the search image.

Figure 7:
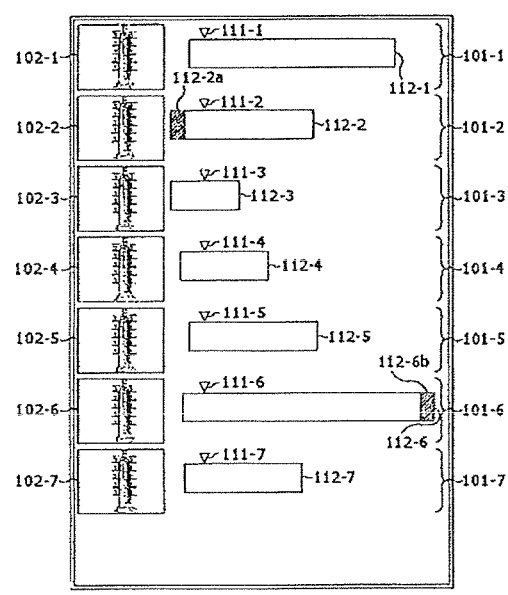
FIG. 7 is a schematic view of a typical screen extracting and displaying only the scenes including images similar to the search image.

FIG. 7 is a schematic view of a typical screen displaying a list of scenes including images similar to the search image. This is a typical screen that appears when, for example, the screen of FIG. 3 is displayed as a result of the search through the contents using the image in FIG. 2 as the search image. That is, the search image and the search result in the example of FIG. 7 are the same as those discussed above by reference to FIG. 3.

In FIG. 7, vertically arrayed regions 101-1 through 101-7 display those scenes in the first through the seventh contents which include images similar to the target or search image. Here, the horizontal direction of the regions 101-1 through 101-7 corresponds to the temporal axes of the scenes. The individual scenes are displayed as rectangles 112-1 through 112-7 of which the lengths reflect the temporal length of each of the scenes.

In FIG. 7, the regions 102-1 through 102-7 display still images detected from the individual contents as the images having high degrees of similarity to the search image. That is, the images displayed in the regions 102-1 through 102-7 are the same as those displayed in the still image display regions 52-1 through 52-7 in FIG. 3.

In FIG. 7, inverted triangle symbols 111-1 through 111-7 point to specific locations in the scenes represented by the rectangles 112-1 through 112-7. The locations thus indicated by the symbols include the images displayed in the regions 102-1 through 102-7. As shown in FIG. 7, the rectangles 112-1 through 112-7 are each displayed in such a manner that the symbols 111-1 through 111-7 are at the same position in the vertical direction of the illustration.

For example, of the scenes displayed in the regions 101-1 through 101-7, the scene with the longest temporal length from its start time up to the symbol 111 has its starting location aligned with the leftmost position of the region 101. In this case, the starting locations of the second and the third scenes from the top are aligned with the leftmost position of the region 101. Also, of the scenes displayed in the regions 101-1 through 101-7, the scene with the longest temporal length from its end time up to the symbol 111 has its ending location aligned with the rightmost position of the region 101. In this case, the ending location of the sixth scene from the top is aligned with the rightmost position of the region 101.

And the leftmost edge 112-2a of the rectangle 112-2 corresponding to the scene with the longest temporal length from its start time up to the symbol 111 is displayed highlighted typically using a particular color (e.g., red). Likewise, the rightmost edge 112-6b of the rectangle 112-6 corresponding to the scene with the longest temporal length from its end time up to the symbol 111 is displayed highlighted typically using a specific color (e.g., blue).

When the display is given as described above, the user can easily compare the temporal lengths of the entire scenes, the temporal lengths of the scenes from the start time up to the point at which the target image is displayed (i.e., up to symbol 111), and the temporal lengths of the scenes from the point at which the target image is displayed until the end time.

Through the above comparisons, it is easy to detect appropriate scenes typically when a new content is to be edited using the content data accumulated in the media archive 22. Also, it is possible efficiently to manage the media archive 22 by, say, deleting the scenes that are highly likely to overlap with one another. Furthermore, even if a broadcast timetable is changed at the last minute, it is easy to verify which content is to be broadcast.

In the past, when the result of an image search through contents was displayed, it was customary to display the image of the first frame or a representative image of each content obtained as a result of the search. Where the frames corresponding to the search image were detected from the contents, the images of these frames were displayed.

However, where a plurality of results were obtained from the search, it was difficult, if not impossible, to compare these results in the form of moving images by use of the conventional techniques. Consequently, it was impossible, or at least difficult, to compare the contents in terms of what was contained inside based on the results of the search. For example, when thumbnails or representative images were conventionally displayed as the results of the search, the user had no choice but to compare the contents in terms of what was contained inside by visually checking these thumbnails or representative images stemming from the multiple search results. Also, although the conventional techniques permitted reproduction of each content containing the images obtained from the search for verification purposes, it was extremely difficult to simultaneously compare a plurality of search results constituting the multiple contents displayed as moving images.

According to the present invention, by contrast, the results of the search for images through moving image contents can be verified simultaneously as a plurality of moving image contents as described above by reference to FIGS. 3 through 7. Consequently, the results of the search through moving image contents are displayed in a more comprehensible manner for verification by the user.

Figure 8:
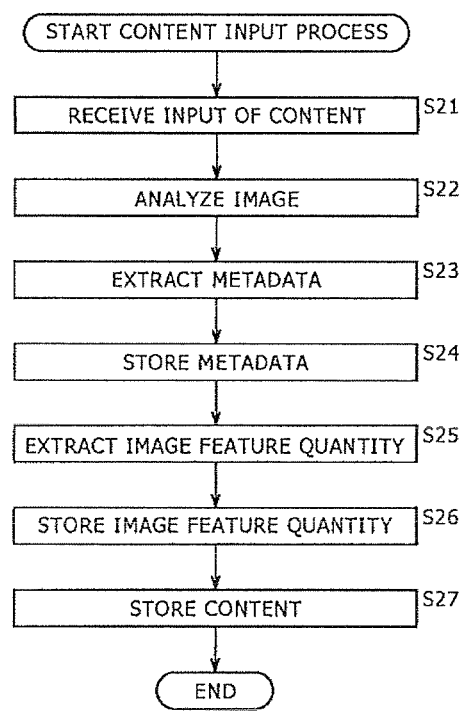
FIG. 8 is a flowchart explanatory of a typical content input process.

Explained next by reference to the flowchart of FIG. 8 is a typical content input process performed by the content searching apparatus 10 in FIG. 1.

In step S21, the content input section 21 receives the input of content data. As described above, the input contents are moving image contents that may include sounds and captions as needed. For example, these contents are the contents edited as part of a TV program to be broadcast.

In step S22, the image processing section 23 analyzes the content data supplied from the content input section 21 in step S21.

In step S23, the image processing section 23 extracts metadata based on the result of the analysis in step S22. In this context, the metadata typically refers to information about scene change points of the contents, and information about points in time that are necessary for providing a timeline display to be discussed later, as well as file names and data sizes.

In step S24, the metadata database 24 stores the metadata extracted in step S23. The metadata is stored typically in correspondence with content identification information.

In step S25, the image processing section 23 extracts image feature quantities (e.g. particular features) based on the analysis in step S22. In this context, the image feature quantity is information used in the process performed by the search section 33 to obtain degrees of similarity to a search image. For example, where a single-frame still image making up part of a content is divided into a plurality of predetermined areas, the representative color of each of these areas may be described using information constituting the image feature quantity. As another example, the image feature quantity may be the information formed by a histogram of the pixel values of a single-frame still image.

In step S26, the image feature quantity database 25 stores the image feature quantities extracted in step S25. The image feature quantities are typically stored in correspondence with content identification information and frame numbers.

In step S27, the media archive 22 stores the data of the contents of which the input was received in step S21. Typically, the media archive 22 stores the content data together with identification information for identifying the individual contents.

The contents are input and stored into the media archive 22 as described above.

Figure 9:
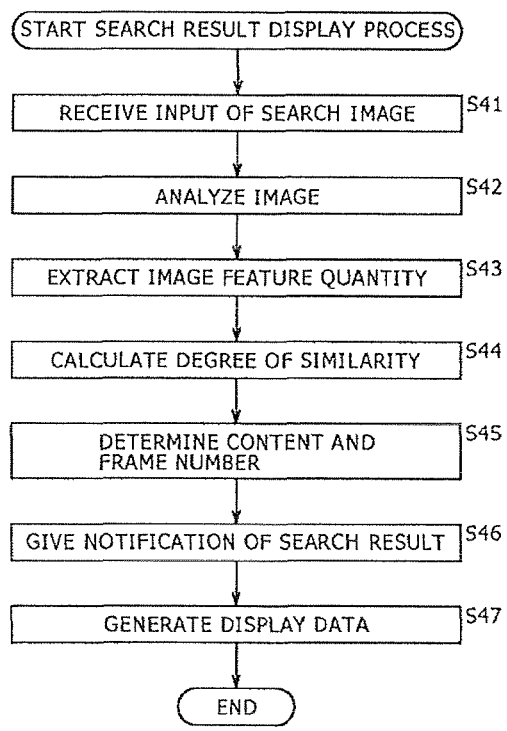
FIG. 9 is a flowchart explanatory of a typical search result display process.

Explained next by reference to the flowchart of FIG. 9 is a typical search result display process performed by the content searching apparatus 10 in FIG. 1.

In step S41, the search image input section 31 receives the input of a search image that is a still image. The search image may be any image selected by the user, and is input so as to search the contents stored in the media archive 22 for images similar to the search image in question.

In step S42, from the search image input through the search image input section 31 in step S41, the image feature quantity extraction section 32 extract an image feature quantity in the same manner as in step S25.

In step S44, the search section 33 compares the image feature quantity extracted from the search image in step S43, with the image feature quantities stored in the image feature quantity database 25 in accordance with a predetermined principle. Through the comparison, the search section 33 calculates as a numerical value the degree of similarity between the image feature quantity of the search image on the one hand, and the image feature quantity of each of the single-frame still images making up each of the contents stored in the image feature quantity database 25 on the other hand.

In step S45, the search section 33 determines the still images having the image feature quantities of which the degrees of similarity to the image feature quantity of the search image are typically higher than a predetermined threshold value, and determines identification information about the contents from which these still images were detected, as well as the frame numbers of these still images. If, from a single content, a plurality of still images have been detected which possess the image feature quantities whose degrees of similarity to the image feature quantity of the search image are higher than a predetermined threshold value, then the search section 33 determines the frame number of the still image typically having the highest degree of similarity.

In the manner described above, the contents stored in the media archive 22 are searched for those contents that include images similar to the search image of which the input was received in step S41.

In step S46, the search section 33 notifies the search result output section 34 of the results of the search in step S45. In this case, the search result output section 34 is typically supplied with the identification information about the contents that include the still images similar to the search image and the frame numbers of these still images.

In step S47, the search result output section 34 generates display data for displaying the search results based on the information supplied in step S46. For example, on the basis of the content identification information, the search result output section 34 reads metadata about the contents in question from the metadata database 24, and generates display data for displaying the search results based on the frame numbers of the still images and on the retrieved metadata.

The display data output from the search result output section 34 is typically sent to a display device for display as images to be described later. As a result of this, the screen such as the one discussed above by reference to FIG. 3 is displayed on the display device.

Later, in response to GUI operations on the display screen or the like, the search result output section 34 generates suitable display data for displaying the screens such as those shown in FIGS. 4 through 7.

In the manner described above, the search result display process is carried out.

In the example discussed above by reference to FIG. 1, the content search apparatus 10 was explained to include the content input section 21 and image processing section 23. Alternatively, the content search apparatus 10 may be arranged to exclude the content input section 21 and image processing section 23. That is, the display data need only be generated by searching the media archive 22, metadata database 24, and image feature quantity database 25 each having data stored therein beforehand, for the contents including the images similar to the search image.

And in the foregoing description, the display screen for displaying the results of search by the content searching apparatus 10 was shown to provide the timeline display of the contents with their temporal axes set to correspond to the horizontal direction of the illustration. Alternatively, the contents may be shown on the timeline display in such a manner that their temporal axes are arranged to correspond to the vertical direction of the illustration.

Incidentally, the series of the processes described above may be executed either by hardware or by software. Where the software-based processing is to be carried out, the programs constituting the software may be installed on a non-transitory computer-readable storage medium, such as a RAM or a non-volatile memory, over a network or from a recording medium into a computer incorporated in dedicated hardware. Such programs may be installed from the recording medium into the computer such as a general-purpose computer 700 shown in FIG. 10 or like equipment capable of executing diverse functions based on the installed programs.

Figure 10:
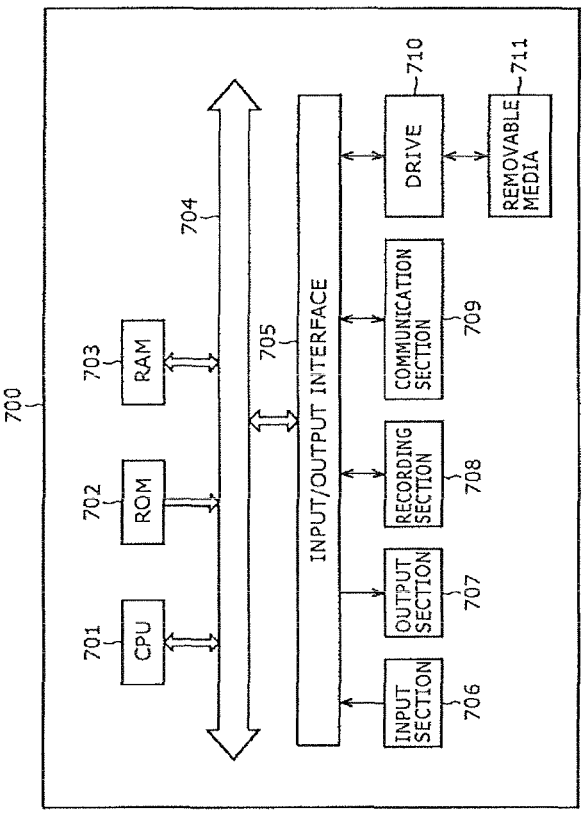
FIG. 10 is a block diagram showing a typical structure of a personal computer.

In FIG. 10, a CPU (Central Processing Unit) 701 performs various processes in accordance with programs stored in a ROM (Read Only Memory) 702 or in keeping with programs loaded from a storage section 708 into a RAM (Random Access Memory) 703. Also, the RAM 703 may accommodate data necessary for the CPU 701 to carry out the diverse processing.

The CPU 701, ROM 702, and RAM 703 are interconnected via a bus 704. An input/output interface 705 is also connected to the bus 704.

The input/output interface 705 is connected with an input section 706 typically made up of a keyboard and a mouse, and with an output section 700 typically composed of a display device such as an LCD (Liquid Crystal Display) and speakers. The input/output interface 705 is also connected with a storage section 708 typically formed by a hard disk and with a communication section 709 typically constituted by a modem and/or a network interface card such as a LAN card. The communication section 709 processes communications conducted over networks including the Internet.

A drive 710 is also connected to the input/output interface 705 as needed. Removable media 711 such as a magnetic disk, an optical disk, a magneto-optical disk, or a semiconductor memory may be attached to the drive 710. Computer programs read from the removable media are installed as needed into the storage section 708.

Where the series of the above-described processes is to be carried out by software, the programs making up the software are installed on storage media over networks including the Internet or from recording media such as the removable media 711.

The recording media are offered to distribute the programs to users not only as the removable media 711 apart from the apparatus proper shown in FIG. 10 and constituted by magnetic disks (including floppy disks (registered trademark)), optical disks (including CD-ROM (Compact Disk-Read Only Memory) and DVD (Digital Versatile Disk)), magneto-optical disks (including MD (Mini-Disk; registered trademark)), or semiconductor memories, each accommodating the programs; but also in the form of the ROM 702 or the hard disk in the storage section 708, each accommodating the programs and incorporated beforehand in the users' apparatus.

In this description, the series of the processes discussed above include not only the processes carried out in the depicted sequence (i.e., on a time series basis) but also processes that may be conducted parallelly or individually and not necessarily chronologically.

It should be understood that the present invention when embodied is not limited to the above-described embodiments and that various modifications. For example, various components of content searching apparatus 10 in FIG. 1 may be embodied in one or more devices or servers that may be connected to a network, such as the Internet. Some functions, described above, may be performed remotely from the site of apparatus 10. Other variations and alternatives may be made of the invention so far as they are within the scope of the appended claims or the equivalents thereof.

The invention claimed is:

1. Apparatus for displaying moving images of different moving image contents, the moving images containing one or more still images having image features that match selected image features, said apparatus comprising:

an identifying unit configured to identify at least one particular still image included in different moving image contents, the identified still image having one or more image features that closely resemble one or more of the selected image features; and a display information generator configured to generate information to cause a display, on timelines associated with the different moving image contents, of marker symbols representing the locations of the identified still image in different ones of said moving image contents, the marker symbols on the timelines associated with the different moving image contents being displayed in alignment with each other on a common axis of the timelines;

the display information generator being further configured to generate information to cause plural different moving images, as represented by the different moving image contents, to be reproduced and displayed concurrently as plural different moving images of the different moving image contents.

2. The apparatus of claim 1, wherein said identifying unit compares said one or more selected image features to corresponding features of still images in said different moving image contents.

3. The apparatus of claim 1, wherein said identifying unit identifies scenes in each of said different moving image contents that contain a still image whose features closely resemble said one or more selected features; and wherein said display information generator generates information to cause the display of said identified scenes.

4. The apparatus of claim 1, wherein said different moving image contents include audio information associated with said different moving image contents, and wherein said display information generator generates information to cause the display of timelines of signal waveforms of said audio information in respective ones of said different moving image contents.

5. The apparatus of claim 3, wherein said display information generator generates information to cause the display of indicia associated with respective ones of said different moving image contents representing durations and/or colors of the scenes in said respective moving image contents.

6. The apparatus of claim 1, wherein said display information generator generates information to cause the display, along said timelines, of moving sliders representing current reproduction positions of the different moving image contents.

7. The apparatus of claim 1, wherein said identifying unit identifies scenes in each of said different moving image contents that contain a still image whose features closely resemble said one or more selected image features.

8. A method for displaying moving images of different moving image contents, the moving images containing one or more still images having image features that match selected image features, said method comprising:

identifying at least one particular still image included in different moving image contents, the identified still image having one or more image features that closely resemble one or more of the selected image features;

causing a display on timelines associated with the different moving image contents of marker symbols representing the locations of the identified still image in different ones of said moving image contents, the marker symbols on the timelines associated with the different moving image contents being displayed in alignment on a common axis of the timelines; and causing plural different moving images, as represented by the different moving image contents, to be reproduced and displayed concurrently as plural different moving images of the different moving image contents.

9. The method of claim 8, wherein said one or more still images are identified by comparing said one or more selected features to corresponding features of still images in said different moving image contents.

10. The method of claim 8, wherein scenes in each of said different moving image contents that contain a still image whose features closely resemble said one or more selected features are identified; and wherein said identified scenes are displayed.

11. The method of claim 8, wherein said different moving image contents include audio information associated with said different moving image contents, and further comprising displaying timelines of signal waveforms of said audio information in respective ones of said different moving image contents.

12. The method of claim 10, further displaying indicia associated with respective ones of said different moving image contents representing durations and/or colors of the scenes in said respective moving image contents.

13. The method of claim of claim 8, further comprising displaying moving sliders along said timelines, said moving sliders representing current reproduction positions of the different moving image contents.

14. A non-transitory computer-readable medium encoded with instructions that, when read by a computer, executes the method for displaying moving images of different moving image contents, the moving images containing one or more still images having image features that match selected image features, comprising:

identifying at least one particular still image included in different moving image contents, the identified still image having one or more image features that closely resemble one or more of the selected image features;

causing a display on timelines associated with the different moving image contents of marker symbols representing the locations of the identified still image in different ones of said moving image contents, the marker symbols on the timelines associated with the different moving image contents being displayed in alignment on a common axis of the timelines; and causing plural different moving images, as represented by the different moving image contents, to be reproduced and displayed concurrently as plural different moving images of the different moving image contents.

15. Apparatus for identifying one or more still images in plural different image contents representing different moving images, said apparatus comprising:

an image input unit configured to receive an input search image;

an identifying unit configured to identify at least one still image included in said plural different moving image contents that match the inputted search image by comparing the inputted search image to the still images in the plural different moving image contents; and a display information generator configured to generate information to cause a display, on timelines associated with the different moving images, of marker symbols representing the locations in the plural different moving image contents of a still image that matches the inputted search image, the marker symbols representing the locations of the still image in respective ones of the plural different moving image contents that matches the inputted search image being displayed on the timelines associated with the plural different moving image contents and in alignment on a common axis of the timelines.

* * * * *